(12) United States Patent
Bae et al.

(10) Patent No.: US 10,754,171 B2
(45) Date of Patent: Aug. 25, 2020

(54) METHOD OF CORRECTING OPTICAL CHARACTERISTICS OF BACK LIGHT UNIT FOR THREE-DIMENSIONAL DISPLAY APPARATUS

(71) Applicant: SAMSUNG ELECTRONICS CO., LTD., Suwon-si (KR)

(72) Inventors: Jihyun Bae, Seoul (KR); Joonyong Park, Suwon-si (KR); Youngju Jeong, Yongin-si (KR); Bongsu Shin, Seoul (KR); Dongouk Kim, Pyeongtaek-si (KR); Dongsik Shim, Hwaseong-si (KR); Sunghoon Lee, Seoul (KR); Jaeseung Chung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 195 days.

(21) Appl. No.: 15/655,327

(22) Filed: Jul. 20, 2017

(65) Prior Publication Data

US 2018/0136478 A1 May 17, 2018

(30) Foreign Application Priority Data

Nov. 14, 2016 (KR) ........................ 10-2016-0151310

(51) Int. Cl.
*H04N 13/04* (2006.01)
*G02B 30/00* (2020.01)
(Continued)

(52) U.S. Cl.
CPC ....... *G02B 30/00* (2020.01); *G02F 1/133602* (2013.01); *G06T 7/001* (2013.01);
(Continued)

(58) Field of Classification Search
CPC .............. G09G 2360/16; G09G 3/3406; G02F 1/133602
See application file for complete search history.

(56) References Cited

U.S. PATENT DOCUMENTS 7,944,431 B2   5/2011  Tanaka et al.
2003/0231158 A1*  12/2003  Someya ............... G09G 3/3611
                                                     345/101

(Continued)

FOREIGN PATENT DOCUMENTS

JP         2008-122713 A      5/2008
KR     10-2009-0002730 A      1/2009
(Continued)

*Primary Examiner* — Fabio S Lima
(74) *Attorney, Agent, or Firm* — Sughrue Mion, PLLC

(57) ABSTRACT

A method of correcting optical characteristics of a back light unit (BLU) for a three-dimensional (3D) display apparatus includes: obtaining first optical characteristics of a reference image; obtaining a corrected image by applying an initial correction value, which is determined based on the first optical characteristics, to the reference image; obtaining second optical characteristics of the corrected image; determining whether the second optical characteristics match reference optical characteristics; outputting the corrected image based on determining that the second optical characteristics match the reference optical characteristics, and obtaining a new corrected image and repeating, for the new corrected image, the obtaining the second optical characteristics and the determining whether the second optical characteristics match the reference optical characteristics, based on determining that the second optical characteristics of the corrected image do not match the reference optical characteristics.

20 Claims, 14 Drawing Sheets

(51) Int. Cl.
*G09G 3/00* (2006.01)
*G02F 1/13357* (2006.01)
*G06T 7/00* (2017.01)
*G09G 3/34* (2006.01)

(52) U.S. Cl.
CPC ........... G09G 3/003 (2013.01); G09G 3/3406 (2013.01); *G09G 3/3413* (2013.01); *G09G 2320/0666* (2013.01); *G09G 2360/16* (2013.01)

(56) References Cited

U.S. PATENT DOCUMENTS

| | | | | |
|---|---|---|---|---|
| 2009/0303172 | A1* | 12/2009 | Park | G09G 3/3406 345/102 |
| 2010/0053222 | A1* | 3/2010 | Kerofsky | G09G 3/3406 345/690 |
| 2010/0225574 | A1* | 9/2010 | Fujiwara | G09G 3/3426 345/102 |
| 2013/0308012 | A1* | 11/2013 | Fukutomi | H04N 1/407 348/229.1 |
| 2017/0352142 | A1* | 12/2017 | Tsuchiya | H01L 41/0475 |
| 2017/0372666 | A1* | 12/2017 | Umeyama | H01M 4/62 |
| 2018/0090076 | A1* | 3/2018 | Zhang | G09G 3/342 |

FOREIGN PATENT DOCUMENTS

| | | |
|---|---|---|
| KR | 10-2013-0037326 A | 4/2013 |
| KR | 10-2013-0112371 A | 10/2013 |
| WO | 2015/091014 A1 | 6/2015 |

\* cited by examiner

| 11 | 12 | 13 | 14 | 15 |
| 21 | 22 | 23 | 24 | 25 |
| 31 | 32 | 33 | 34 | 35 |
| 41 | 42 | 43 | 44 | 45 |
| 51 | 52 | 53 | 54 | 55 |

| RED | 1 | 2 | 3 | 4 | 5 |
|---|---|---|---|---|---|
| 1 | 433 | 223 | 108 | 50 | 27 |
| 2 | 470 | 204 | 102 | 54 | 27 |
| 3 | 479 | 200 | 89 | 48 | 24 |
| 4 | 453 | 175 | 82 | 46 | 32 |
| 5 | 406 | 165 | 111 | 100 | 82 |
| GREEN | 1 | 2 | 3 | 4 | 5 |
| 1 | 315 | 334 | 338 | 350 | 335 |
| 2 | 206 | 197 | 207 | 218 | 211 |
| 3 | 147 | 142 | 144 | 149 | 153 |
| 4 | 107 | 103 | 104 | 108 | 113 |
| 5 | 81 | 73 | 73 | 84 | 84 |
| BLUE | 1 | 2 | 3 | 4 | 5 |
| 1 | 22 | 25 | 31 | 39 | 57 |
| 2 | 14 | 17 | 22 | 32 | 52 |
| 3 | 10 | 14 | 18 | 27 | 50 |
| 4 | 8 | 11 | 16 | 26 | 49 |
| 5 | 13 | 13 | 15 | 24 | 43 |
| WHITE | 1 | 2 | 3 | 4 | 5 |
| 1 | 792 | 580 | 479 | 441 | 396 |
| 2 | 697 | 425 | 336 | 306 | 279 |
| 3 | 645 | 366 | 258 | 229 | 215 |
| 4 | 568 | 296 | 204 | 183 | 190 |
| 5 | 507 | 255 | 206 | 215 | 200 |

METHOD OF CORRECTING OPTICAL CHARACTERISTICS OF BACK LIGHT UNIT FOR THREE-DIMENSIONAL DISPLAY APPARATUS

CROSS-REFERENCE TO RELATED APPLICATION

This application claims priority from Korean Patent Application No. 10-2016-0151310, filed on Nov. 14, 2016, in the Korean Intellectual Property Office, the disclosure of which is incorporated herein in its entirety by reference.

BACKGROUND

1. Field

Methods and apparatuses consistent with exemplary embodiments disclosed herein relate to an image correction method of an image display apparatus, and more particularly, to a method of correcting optical characteristics of a back light unit (BLU) based on a diffraction pattern for a glassless three-dimensional (3D) display apparatus.

2. Description of the Related Art

A directional back light unit (DBLU) is used as one of light sources for a three-dimensional (3D) image display apparatus. In the DBLU, red light (hereinafter, R), green light (hereinafter, G), and blue light (hereinafter, B) may be incident on a light guide panel (LGP) at certain incident angles in various directions of the LGP. For example, in the DBLU, the R, the G, and the B light may be respectively incident on the LGP at certain incident angles through four surfaces of the LGP. In addition, incident light at respective corresponding angles may pass through gratings of the LGP and be emitted as directional light. Each of the R, the G, and the B light incident on the LGP may proceed along the LGP, reach the gratings inside the LGP, and be diffracted in certain directions via the gratings.

The gratings may be repeatedly placed in certain directions and be distributed over an entire portion of a light emitting surface of the LGP. Accordingly, the R, the G, and the B light may be respectively emitted in desired directions toward a front surface (a front side surface) of the LGP.

The R, the G, and the B light entering through side surfaces of the LGP may proceed inside the LGP via total reflection, and when the R, the G, and the B light reach the gratings corresponding to respective colors, the R, the G, and the B light may be respectively diffracted via corresponding gratings and be respectively emitted in certain directions. The R, the G, and the B light entering the LGP may proceed inside the LGP via total reflection until being emitted via diffraction. Light emitted from the LGP in this manner may pass through modulators such as color filters and liquid crystals and enter a 3D image panel.

SUMMARY

Exemplary embodiments disclosed herein may provide a method of correction for enhancing optical characteristics of a back light unit (BLU) in a three-dimensional (3D) display apparatus including a directional back light unit (DBLU).

According to an aspect of an exemplary embodiment, there is provided a method of correcting optical characteristics of a back light unit (BLU) for a three-dimensional (3D) display apparatus, the method including: obtaining first optical characteristics of a reference image; obtaining a corrected image by applying an initial correction value, which is determined based on the first optical characteristics, to the reference image; obtaining second optical characteristics of the corrected image; determining whether the second optical characteristics match reference optical characteristics; outputting the corrected image based on determining that the second optical characteristics match the reference optical characteristics, and obtaining a new corrected image and repeating, for the new corrected image, the obtaining the second optical characteristics and the determining whether the second optical characteristics match the reference optical characteristics, based on determining that the second optical characteristics of the corrected image do not match the reference optical characteristics.

The reference image may be an image including a single color throughout the entire reference image and having no particular image within the entire reference image, and may include any one of a red image, a green image, a blue image, and a white image.

The first optical characteristics may include at least one of a luminance distribution function of the reference image, an average value of luminance of the reference image, and a median of luminance of the reference image, and the second optical characteristics may include at least one of a luminance distribution function of the corrected image, an average value of luminance of the corrected image, and a median of luminance of the corrected image.

The obtaining the first optical characteristics for the reference image may include obtaining a luminance distribution function of the reference image, an average value of luminance of the reference image, and a median of luminance of the reference image.

The obtaining the corrected image by applying the initial correction value to the reference image may include applying one of an average value of luminance of the reference image and a median of luminance of the reference image as a correction weight to the reference image.

The obtaining the new corrected image may include adjusting the initial correction value to thereby generate an adjusted corrected value, and applying the adjusted correction value to the corrected image.

The outputting the corrected image based on determining that the second optical characteristics match the reference optical characteristics may include: composing a white image by combining correction values and correction functions detected for a red image of the reference image, a green image of the reference image, and a blue image of the reference image; and transferring the white image to a 3D display panel.

The method may further include: obtaining color coordinates for the white image after the white image has been composed and before the white image is transferred to the 3D display panel; and minimizing differences between the obtained color coordinates and color coordinates of a reference white image.

The minimizing differences between the obtained color coordinates and the color coordinates of the reference white image may include: performing a correction operation for the reference image; and repeating the composing the white image and the obtaining the color coordinates.

The determining whether the second optical characteristics match the reference optical characteristics may include determining whether values of the second optical characteristics are identical to values of the reference optical characteristics.

The determining whether the second optical characteristics match the reference optical characteristics may include determining whether values of the second optical characteristics deviate from values of the reference optical characteristics within a predetermined range.

According to an aspect of another exemplary embodiment, there is provided a method to control a backlight, the method including: applying a correction value to a reference image to obtain a corrected image; comparing optical characteristics of the corrected image to reference optical characteristics; and selectively adjusting the correction value based on the comparing, wherein the reference image includes a single color uniformly distributed throughout the reference image, and the applying, the comparing, and the selectively adjusting are repeatedly performed for different reference images of different colors.

The method may further include obtaining corrected images for each of the different colors as a result of repeatedly performing the applying, comparing, and selectively adjusting.

The method may further include: combining the corrected images to obtain a white image; and transferring the white image to a 3D display panel.

The different colors may include red, green, and blue.

The method may further include obtaining the correction value by: measuring luminance values of the reference image at measurement regions of the backlight; and obtaining the correction value based on the luminance values.

The selectively adjusting the correction value based on the comparing may include: determining whether the optical characteristics of the corrected image are within a predetermined range of the reference optical characteristics; based on determining that the optical characteristics of the corrected image are not within a predetermined range of the reference optical characteristics, adjusting the correction value; and based on determining that the optical characteristics of the corrected image are within the predetermined range of the reference optical characteristics, outputting the corrected image as a final image.

The predetermined range may be a range within 5% of values of the reference optical characteristics.

According to an aspect of another exemplary embodiment, there is provided a method to control a backlight, the method including: obtaining a correction value based on optical characteristics of a reference image; applying the correction value to the reference image to obtain a corrected image; determining whether optical characteristics of the corrected image fall within a predetermined range and outputting a result of the determining; and selectively repeating the obtaining, the applying, and the determining based on the result.

The reference image may include a single color uniformly distributed throughout the reference image.

Additional aspects will be set forth in part in the description which follows and, in part, will be apparent from the description, or may be learned by practice of the presented exemplary embodiments

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
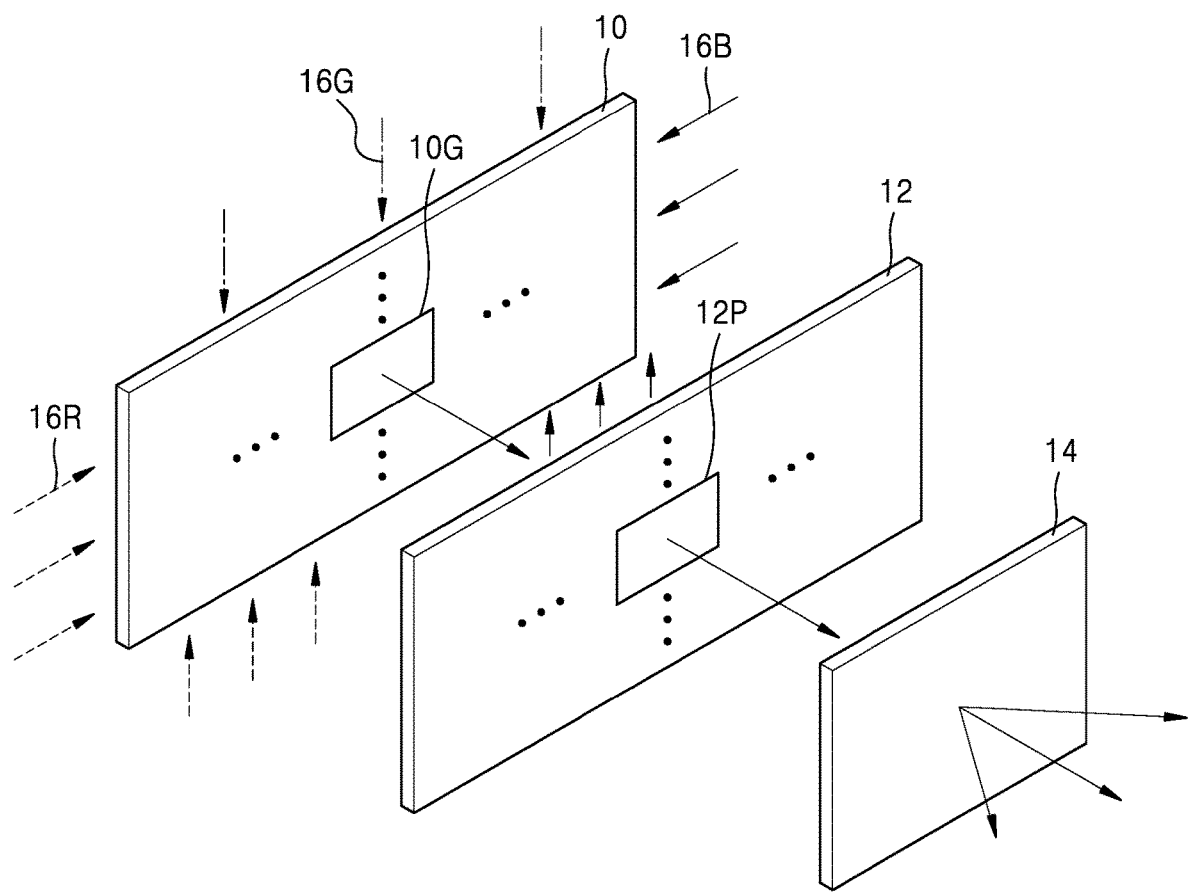
FIG. 1 is a perspective diagram illustrating a glassless three-dimensional (3D) display apparatus to which a method of correcting optical characteristics of a back light unit (BLU) for a 3D display apparatus is applied, according to an exemplary embodiment.

Certain exemplary embodiments now will be described more fully hereinafter with reference to the accompanying drawings, in which various exemplary embodiments are shown. The exemplary embodiments may, however, be embodied in many different forms, and should not be construed as limited to the exemplary embodiments set forth herein. Rather, these exemplary embodiments are provided so that this disclosure will be thorough and complete, and will fully convey the scope of the exemplary embodiments to those skilled in the art. Like reference numerals refer to like elements throughout.

It will be understood that when an element is referred to as being "on" another element, the element can be directly on the other element or intervening elements may be present therebetween. In contrast, when an element is referred to as being "directly on" another element, there are no intervening elements present.

It will also be understood that, although the terms "first," "second," "third", etc., may be used herein to describe various elements, components, regions, layers, and/or sections, these elements, components, regions, layers, and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular exemplary embodiments only and is not intended to be limiting. As used herein, the singular forms "a," "an," and "the" are intended to include the plural forms, including "at least one," unless the context clearly indicates otherwise. "At least one" is not to be construed as limiting to "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and indicates that the stated value is within an acceptable range of deviation for the particular value as determined by one of ordinary skill in the art, considering the measurement in question and the error associated with measurement of the particular quantity (e.g., the limitations of the measurement system). For example, "about" can refer to a value within one or more standard deviations, or within ±30%, 20%, 10%, 5% (or some other percentage) of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the exemplary embodiments, and will not be interpreted in an idealized or overly formal sense unless expressly so defined herein.

Exemplary embodiments are described herein with reference to cross section illustrations that are schematic illustrations of idealized exemplary embodiments. As such, variations from the shapes of the illustrations as a result, for example, of manufacturing techniques and/or tolerances, are to be expected. Thus, exemplary embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Below, detailed descriptions will be provided of a method of correcting optical characteristics of a back light unit (BLU) for a glassless three-dimensional (3D) display apparatus with reference to drawings according to exemplary embodiments. In the drawings, the thicknesses of layers and regions are exaggerated for clarity.

FIG. 1 is a perspective diagram illustrating a glassless 3D display apparatus to which a method of correcting optical characteristics of a BLU 10 for a glassless 3D display apparatus is applied, according to an exemplary embodiment.

Referring to FIG. 1, the glassless 3D display apparatus may include the BLU 10, a color filter 12, and a 3D display panel 14. The BLU 10 may be based on a grating. The BLU 10 may be a directional BLU (DBLU) including a light emitting diode (LED) as a light source. A light emitting surface of the BLU 10 may include the grating. The light emitting surface of the BLU 10 may include a plurality of unit diffraction regions 10G. A rear portion of the light emitting surface of the BLU 10 may be a light guide plate, that is, a light guide panel (LGP). The light source may be placed along the periphery of the LGP. Light 16R entering through a left side and a portion of a bottom side of the BLU 10 may denote a red light incident on the LGP. The light 16R may represent that the red light is incident on the LGP from the light source (for example, the LED) emitting the red light. The LED emitting the red light may be disposed on the left side and a portion of the bottom side of the BLU 10. For example, the LED emitting the red light may be disposed on the left side and a portion of the bottom side of the LGP. Light 16B entering through a right side and a portion of the bottom side of the BLU 10 may denote a blue light incident on the LGP. The light 16B may represent an arrangement of the light source (for example, the LED) emitting the blue light and that the blue light is incident on the LGP from the LED. Light 16G entering through a top side of the BLU 10 may denote a green light incident on the LGP. The light 16G may represent an arrangement of the light source (for example, the LED) emitting the green light and that the green light is incident on the LGP from the LED. The color filter 12 may include a plurality of unit pixel regions 12P. The unit diffraction regions 10G of the BLU 10 and the unit pixel regions 12P of the color filter 12 may have a one to one correspondence. Light having passed through the color filter 12 may be incident on the 3D display panel 14 and a 3D image may be provided to a user via the 3D display panel 14.

A composition of a 3D display apparatus using a BLU including a grating and an LED, such as the BLU 10, may be variously changed, and is not limited to the exemplary embodiment in FIG. 1.

Figure 2:
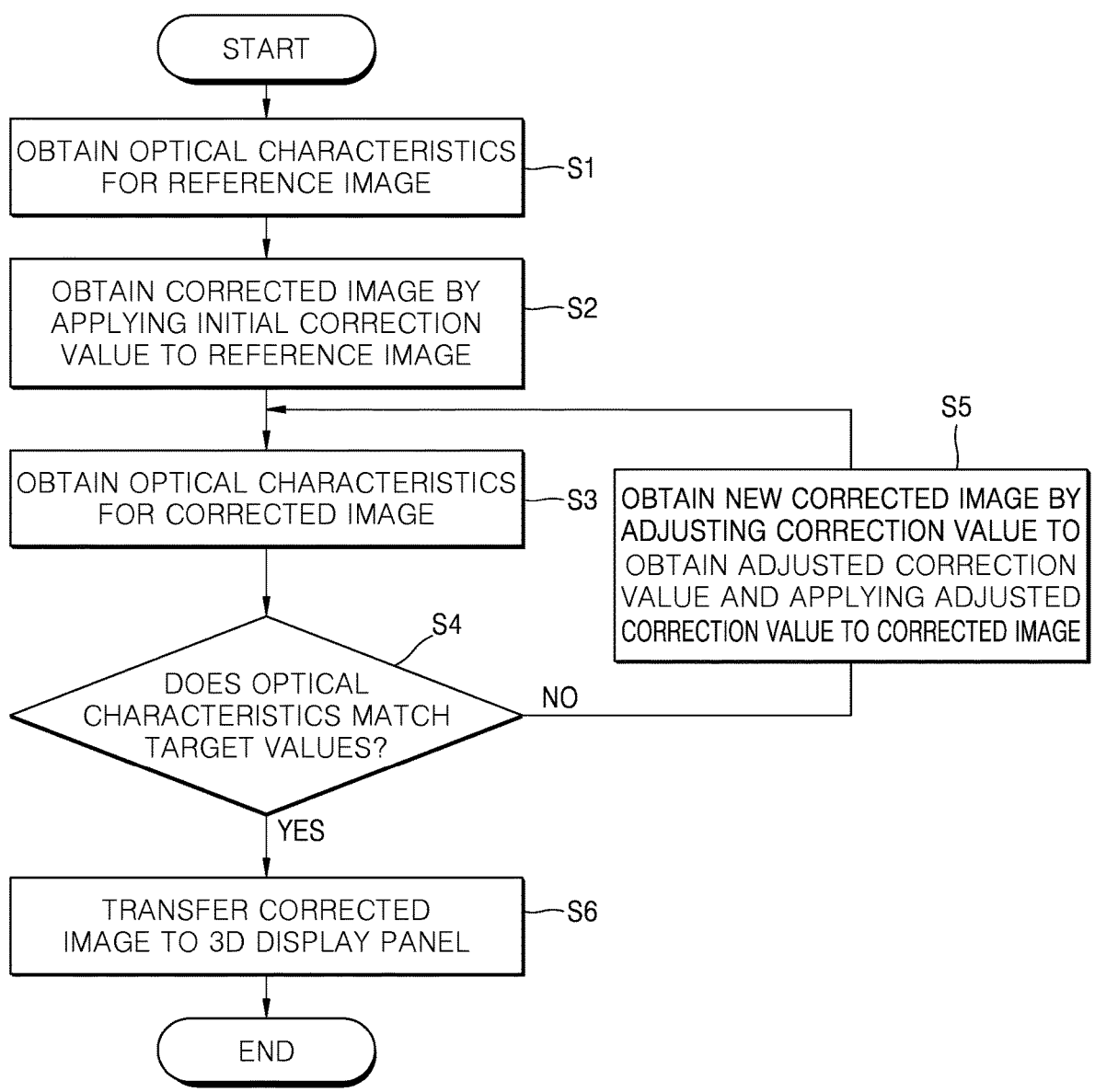
FIG. 2 is a flowchart of the method of correcting optical characteristics of the BLU in the glassless 3D display apparatus, as illustrated in FIG. 1.

FIG. 2 is a flowchart of the method of correcting optical characteristics of the BLU 10 in the glassless 3D display apparatus, as illustrated in FIG. 1.

Referring to FIG. 2, firstly, optical characteristics of a reference image may be obtained in operation S1. The reference image may be expressed as a reference color image. The reference image may be an image for one of a red light (R), a green light (G), and a blue light (B). The reference image may be an image that does not include a detailed image but displays only single colors (for example, a red color, a green color, and a blue color). For example, when the reference image is a red image, the reference image may correspond to a case when power is applied to the LED emitting the R light of the BLU 10 and the R light is emitted from an entire portion of the light emitting surface of the BLU 10. Thus, the red image may be a red image including no particular image.

In other words, when the reference image is the red image, the reference image may be a full red two-dimensional (2D) image including no particular image. A description of a case when the reference image is the red image may be similarly applied when the reference image is a green image or a blue image.

Figures 3, 4:
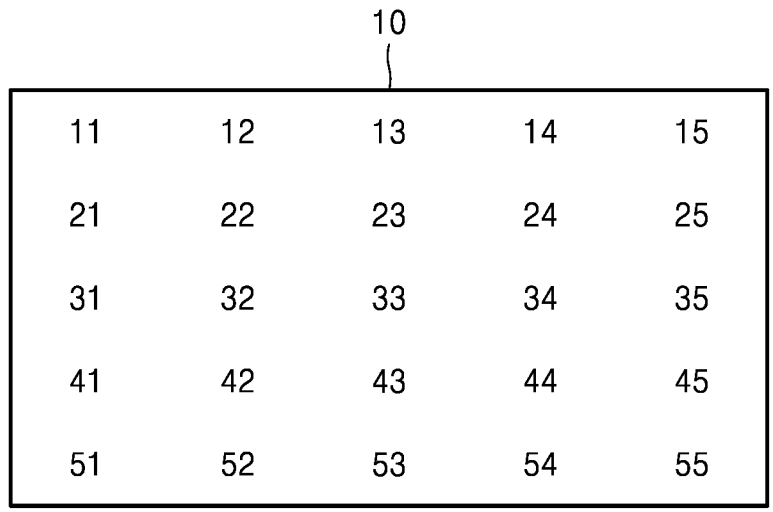
FIG. 3 is a plan view of 25 measurement regions (5×5), on a light emitting surface of the BLU, which are used as measurement regions for measuring optical characteristics of a reference image in the method of correcting optical characteristics of the BLU for the glassless 3D display apparatus, according to an exemplary embodiment.
FIG. 4 is a table of luminance values measured, per color, at the 25 measurement regions illustrated in FIG. 3.

Optical characteristics (hereinafter, also referred to as first optical characteristics) of the reference image may be related to efficiency and a size of the grating included in the BLU 10. For example, the first optical characteristics for the reference image may be a luminance distribution function, an average value of luminance, and/or a median of luminance, etc., for the red image. In this case, the luminance distribution function, the average value of luminance, and/or the median of luminance, etc. may be obtained, based on luminance values measured at a plurality of measurement regions on the light emitting surface of the BLU 10. For example, the luminance distribution function, the average value of luminance, and/or the median of luminance, etc. may be obtained, based on the luminance values measured at 25 measurement regions (5×5) on the light emitting surface of the BLU 10, as illustrated in FIG. 3. The number of measurement regions where the luminance values are measured in the BLU 10 may be greater or less than about 25. Numbers shown inside the BLU 10 in FIG. 3 may denote column numbers and row numbers of the measurement regions. For example, "11" may denote the measurement region at column 1 and row 1, and "55" may denote the measurement region at column 5 and row 5.

FIG. 4 numerically shows a luminance distribution of the BLU 10 and also shows the luminance values measured at the 25 measurement regions illustrated in FIG. 3.

In FIG. 4, "RED" denotes the luminance values at 25 measurement regions of the BLU 10 when the reference image is the red image. Likewise, "GREEN", "BLUE", and "WHITE" denote the luminance values measured at 25 measurement regions when the reference images are respectively the green image, the blue image, and the white image. "1, 2, 3, 4, 5" in a vertical direction denote row numbers, and "1, 2, 3, 4, 5" in a horizontal direction denote column numbers for "RED", "GREEN", "BLUE", and "WHITE" in FIG. 4. Thus, in the case of "RED", a luminance value at row 5 and column 5, that is, 82, may be the luminance value measured at the measurement region 55, that is, at row 5 and column 5 in FIG. 3.

The average value of luminance for the reference image may be obtained via statistical analysis of measured luminance values, for example, the luminance values as illustrated in FIG. 4. The average value of luminance or the median of luminance of the reference image may be used as an initial correction value in subsequent correction operations.

Next, after the first optical characteristics for the reference image have been obtained, a corrected image may be obtained by applying the initial correction value to the reference image in operation S2.

The second operation S2 may include applying the initial correction value to the luminance distribution function of each color for the reference image. The initial correction value may be an initial correction weight. The average value of luminance or the median of luminance may be used as the initial correction value. The corrected image obtained in the second operation S2 may also be a simple color image including no particular image.

Next, the optical characteristics of the corrected image obtained in the second operation S2 may be obtained in operation S3.

Optical characteristics (hereinafter, second optical characteristics) obtained in the third operation S3 may include an intensity distribution function, a luminance uniformity, and/ or the average value of luminance. The intensity distribution function, the luminance uniformity, and/or the average value of luminance obtained in the third operation S3 may be obtained, based on intensity values or the luminance values of light measured at the plurality of measurement regions on the light emitting surface of the BLU 10. For example, the intensity values or the luminance values may be measured at 25 measuring regions, as illustrated in FIG. 3. Also, the number of the measurement regions may be greater or less than about 25. The intensity distribution function obtained in the third operation S3 may be the luminance distribution function for the corrected image.

Next, after the second optical characteristics for the corrected image have been obtained in the third operation S3, it may be determined whether the obtained second optical characteristics match certain target values (or reference optical characteristics) in operation S4.

The certain target values may be reference luminance uniformity and reference average values of luminance. In the fourth operation S4, when the second optical characteristics, for example, the luminance uniformity and the average value of luminance, match target values for the luminance uniformity and the average value of luminance ("YES" in operation S4), the corrected image having the second optical characteristics may be transferred to the 3D display panel 14 in operation S6.

After the correction operation for the reference image per color has been completed, the luminance uniformity of the white image formed via a combination of the correction-completed red image, green image, and blue image, and a final average value of luminance may be in a mutually compensating relationship. Thus, the target values may be established so as not to be contrary to the mutually compensating relationship.

In operation S4, when the second optical characteristics, for example, the luminance uniformity and the average value of luminance, do not match the certain target values ("NO" in operation S4), the correction value may be adjusted and a new corrected image may be obtained by applying an adjusted correction value to the corrected image in operation S5.

In the fifth operation S5, an adjustment of the correction value may be performed by using a value greater or less than the correction value that has been used in a previous operation, for example, the initial correction value used in the second operation S2. The corrected image obtained in the second operation S2 will be defined as a first corrected image and the new corrected image to be obtained in the fifth operation S5 will be defined as a second corrected image for the sake of convenience.

Next, after the second corrected image is obtained in the fifth operation S5, the optical characteristics (for example, the distribution function, the luminance uniformity, and/or the average value of luminance) for the second corrected image may be obtained in the third operation S3. Subsequently, whether the optical characteristics for the second corrected image match the certain target values may be determined in the fourth operation S4. Then, depending on a result of the determination in operation S4, the fifth operation S5 or the sixth operation S6 may be performed. When the optical characteristics for the second corrected image obtained in the third operation S3 do not match the certain target values ("NO" in operation S4), the third through fifth operations S3 through S5 may be repeated until the optical characteristics obtained in the third operation S3 match the certain target values. However, when a correction time is determined to be too long due to excessive repetitions, the repetitions of the third through fifth operations S3 through S5 may be appropriately limited. In other words, an upper limit may be imposed on the number of repetitions.

Whether the second optical characteristics obtained in the third operation S3, for example, the luminance uniformity and the average value of luminance, match certain luminance uniformity and average value of luminance, may be determined as in the following example.

When the second optical characteristics obtained in the third operation S3, for example, the luminance uniformity and the average value of luminance, are the same as the certain target values, the second optical characteristics obtained in the third operation S3 accordingly match the certain target values. In addition, when the second optical characteristics obtained in the third operation S3 are not the same as the certain target values but a difference between the second optical characteristics and the certain target values is within a predetermined tolerance, the second optical characteristics obtained in the third operation S3 may be determined as matching the certain target values. A range of the tolerance may be, for example, within about 5% of the certain target values, but may be greater or less than about 5%.

When the second optical characteristics of the corrected image match the certain target values in the fourth operation S4 ("YES" in operation S4) and the corrected image is transferred to the 3D display panel 14 in operation S6, the sixth operation S6 may include supplying to the 3D display panel 14 a directional light obtained by combining the correction value and the correction function per color. In this case, the directional light may be the white image, which is a combination of the red image, the blue image, and the green image, and may be supplied to the 3D display panel 14 via the color filter 12. The directional light, that is, the white image, may be light whose color distortion is corrected.

As the third through fifth operations S3 through S5 are repeated, the correction value and the correction function (for example, the luminance distribution function) may be finally obtained for the corrected image per color (R, G, B) ("YES" in operation S4). Thus, the white image may be obtained by combining the finally obtained correction value and correction function. Then, color space coordinates for the obtained white image may be obtained via chromaticity diagram analysis. A displacement vector in a color space may be measured in the obtained color space coordinates and a displacement may be analyzed. A difference between color coordinates of the white image and the color coordinates of the reference white image (for example, x=0.3333, y=0.3333) may be identified via the analysis, and the color distortion may be minimized via correction for minimizing the difference (color correction).

When the reference image needs to be corrected during the color correction operation, the color correction may be performed again after the correction for the reference image has been performed.

For example, when an additional correction for the green image, that is, one of the reference images, is needed for minimizing the difference between the color coordinates of the white image obtained via a combination of the finally obtained correction value and correction function and the color coordinates of the reference white image, luminance distribution correction may be performed for the green image via the third through fifth operations S3 through S5, and then a final correction value and correction function for the green image may be obtained. Thereafter, a new white image may be obtained by combining the finally obtained correction value and a correction function per color, and the color coordinates for the newly obtained white image, and the color coordinates of the reference white image may be compared with each other. Distortion per color may be finely corrected via these operations.

In the sixth operation S6, light having the luminance uniformity per color and the color thereof which is corrected may be supplied to the 3D display panel 14.

A database may be established by collecting information related to data generated in each operation of a correction method according to an exemplary embodiment, as described above. The information may be, for example, results of using an average value of luminance and results of using a median of luminance, data of changes in a correction value in repeated operations, and data of subsequent changes in a corrected image, etc. The established database may be used, for example, in a color correction apparatus, etc.

FIGS. 5, 6, 7, and 8 are 3D luminance distribution charts illustrating the luminance distributions, respectively, for the red image, the green image, the blue image, and the white image, measured at the 25 measurement regions illustrated in FIG. 3 of the BLU 10. FIGS. 5 through 8 illustrate results of measurements before correcting the optical characteristics.

Figure 5:
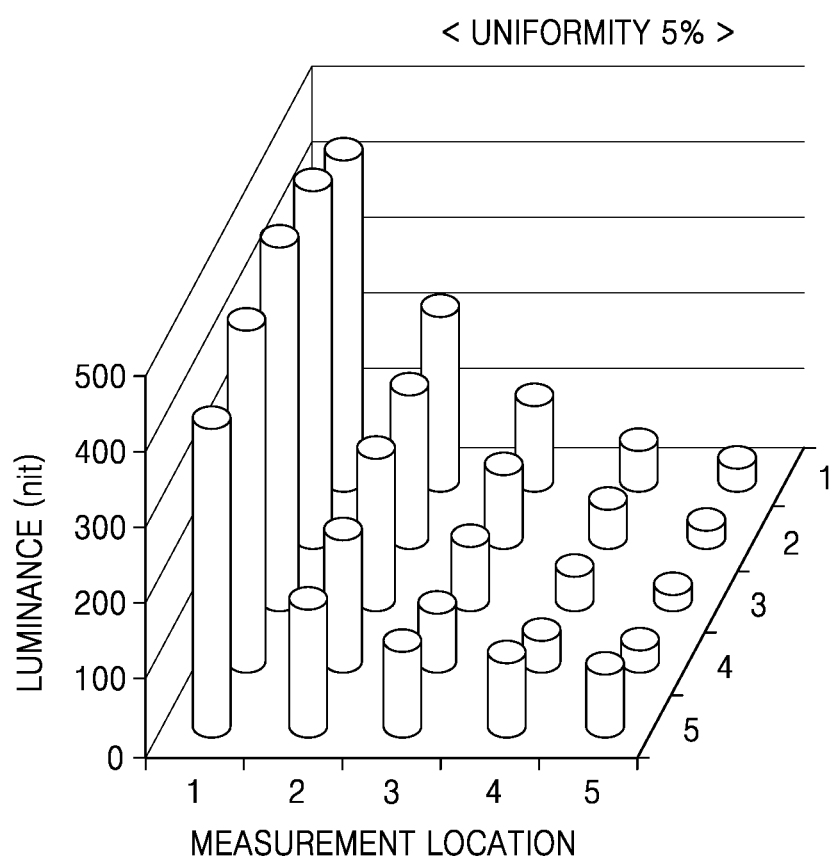
FIGS. 5, 6, 7, and 8 are 3D luminance distribution charts illustrating luminance distributions, respectively, for a red image, a green image, a blue image, and a white image, measured at the 25 measurement regions illustrated in FIG. 3 of the BLU, and are results of measurements before correcting the optical characteristics of the BLU.

Referring to FIG. 5, the luminance uniformity for the red image, before correction of the optical characteristics, may be on the order of about 5%.

Figure 6:
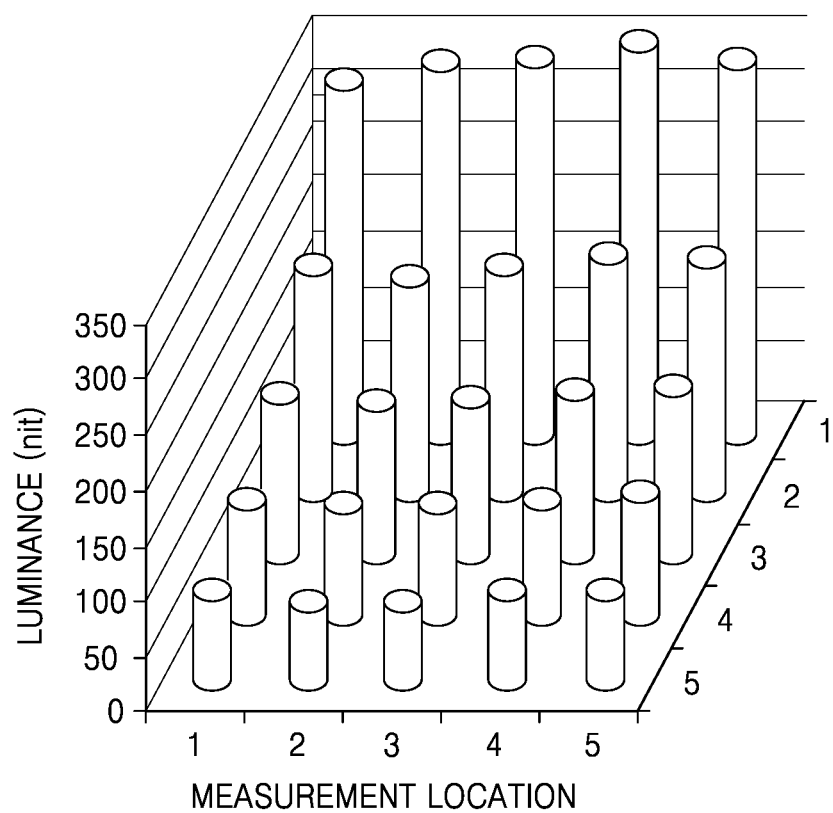

Referring to FIG. 6, the luminance uniformity for the green image, before correction of the optical characteristics, may be on the order of about 22%.

Figure 7:
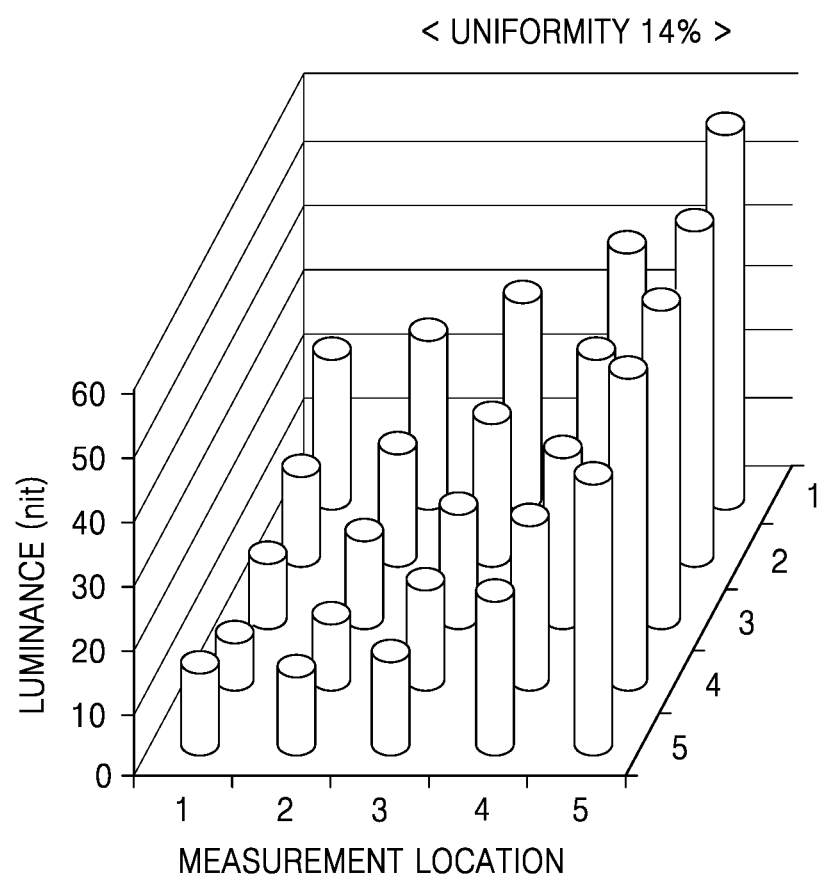

Referring to FIG. 7, the luminance uniformity for the blue image, before correction of the optical characteristics, may be on the order of about 14%.

Figure 8:
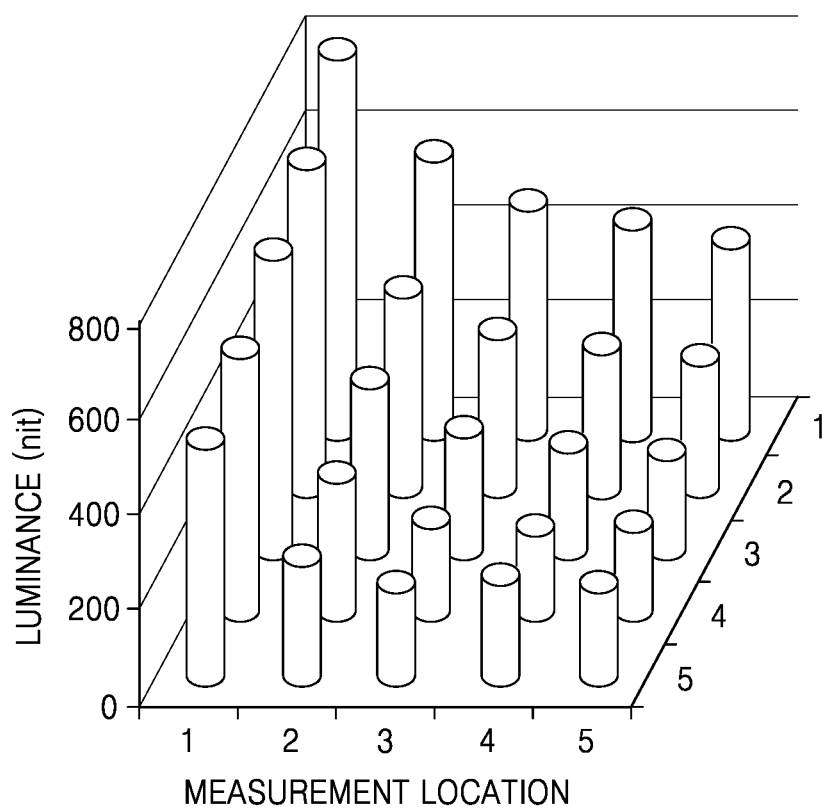

Referring to FIG. 8, the luminance uniformity for the white image, before correction of the optical characteristics, may be on the order of about 23%.

Figure 9:
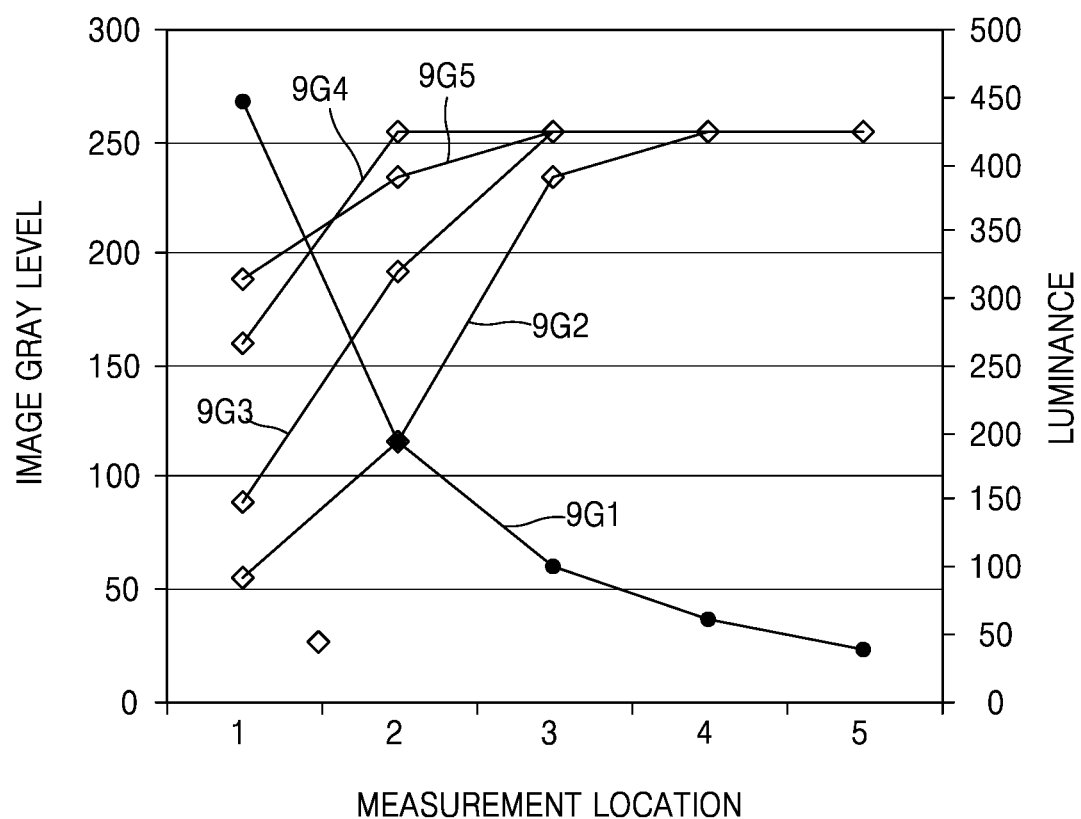
FIGS. 9, 10, and 11 are graphs illustrating change trends of optical characteristics of respective color images, based on corrections in accordance with the method of correcting optical characteristics of the BLU, according to an exemplary embodiment.
Figure 10:
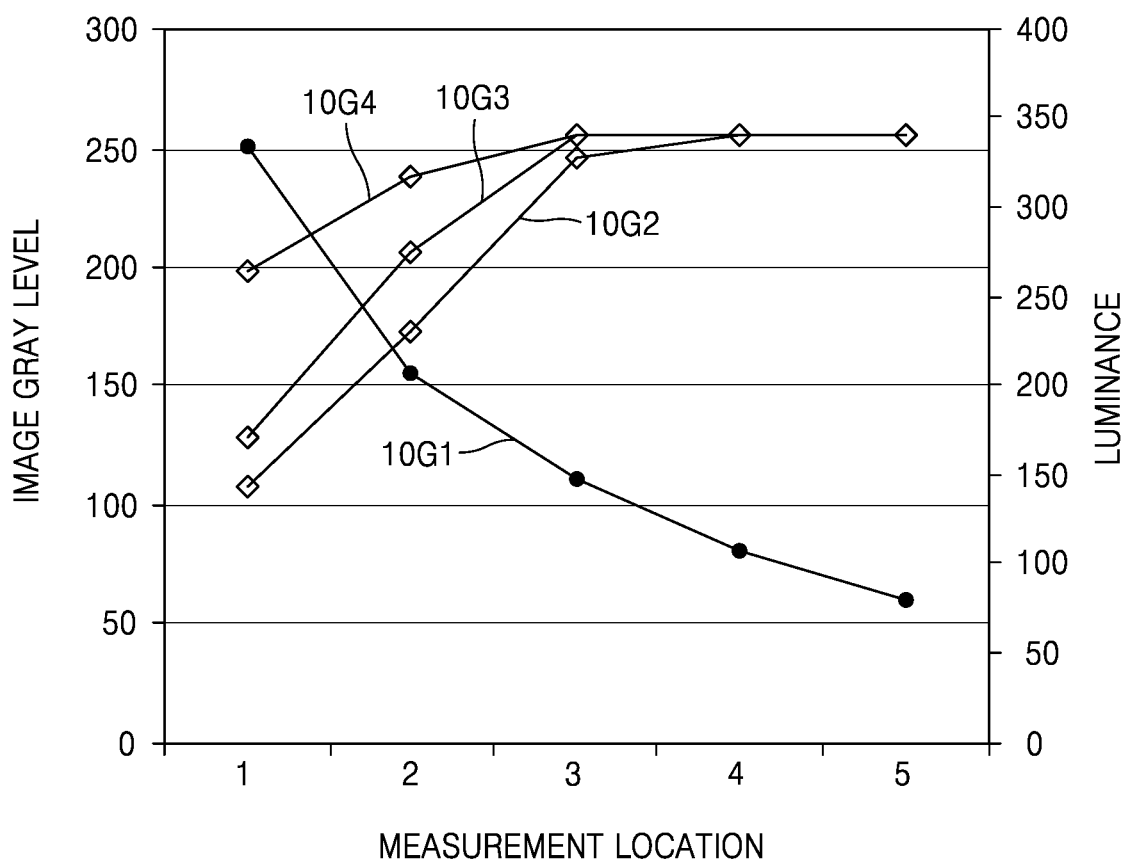
Figure 11:
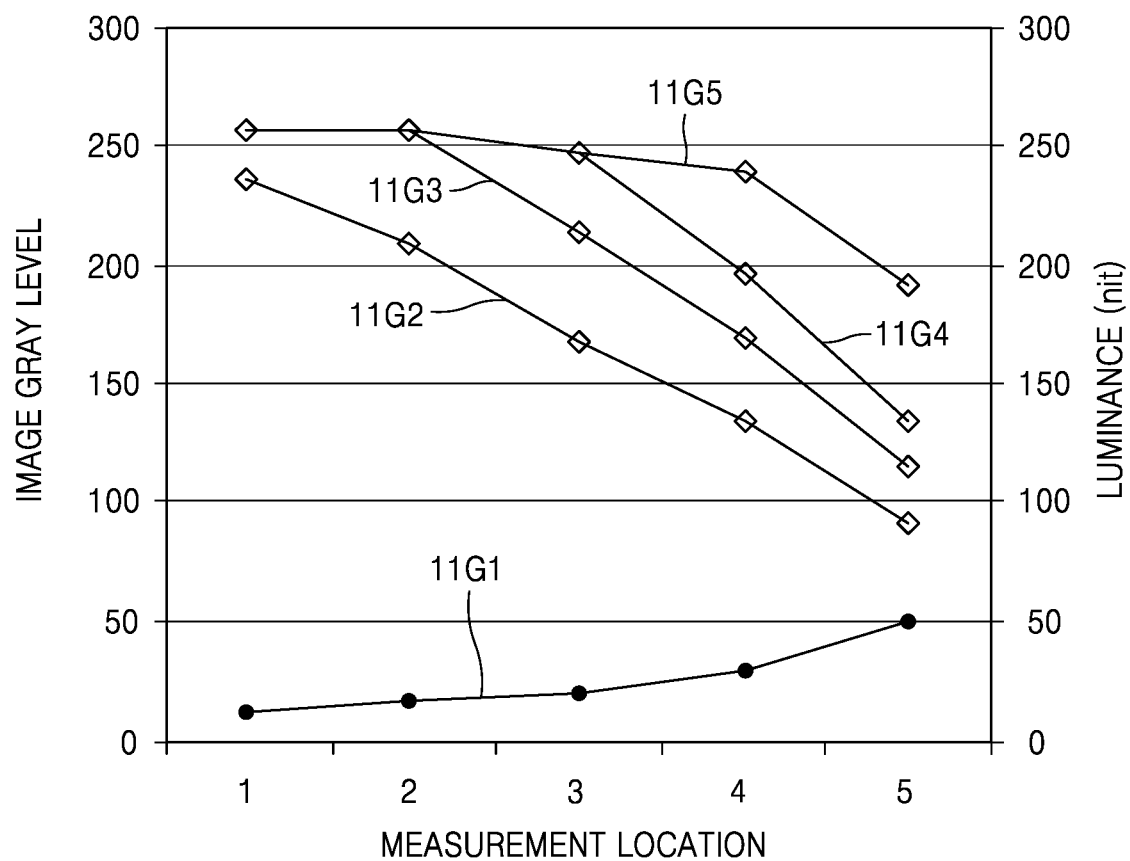

FIGS. 9, 10, and 11 are graphs illustrating change trends of the optical characteristics of the BLU 10, based on corrections in accordance with the method of correcting optical characteristics of the BLU 10, according to an exemplary embodiment.

FIG. 9 illustrates change trends in accordance with correction of the luminance distribution function which is one of the optical characteristics of the BLU 10 when the reference image is the red image.

In FIG. 9, a horizontal axis may denote measurement locations of luminance and a left side vertical axis may denote a gray level of an image, and a right side vertical axis may denote luminance. The above descriptions of the horizontal and vertical axes also apply to FIGS. 10 and 11.

In FIG. 9, a first graph 9G1 may represent a luminance distribution function for the red image before correction of the optical characteristics and a second graph 9G2 may represent a luminance distribution function when the median of luminance is used as the initial correction value. A third graph 9G3 may represent a luminance distribution function when the average value of luminance is used as the initial correction value. A fourth graph 9G4 may represent a luminance distribution function after a correction by using the initial correction value and a first correction has been performed. A fifth graph 9G5 may represent a luminance distribution function after a correction by using the initial correction value and a second correction have been performed.

Referring to the first through fifth graphs 9G1 through 9G5 of FIG. 9, it will be understood that the luminance uniformity gradually increases as the number of corrections increases.

FIG. 10 illustrates change trends in accordance with correction of the luminance distribution function which is one of the optical characteristics of the BLU 10, when the reference image is the green image.

In FIG. 10, a first graph 10G1 may represent a luminance distribution function for the red image before correction of the optical characteristics and a second graph 10G2 may represent a luminance distribution function when the median of luminance is used as the initial correction value. A third graph 10G3 may represent a luminance distribution function when the average value of luminance is used as the initial correction value. A fourth graph 10G4 may represent a luminance distribution function after a correction by using the initial correction value and a second correction have been performed.

Referring to the first through fourth graphs 10G1 through 10G4 of FIG. 10, the luminance uniformity gradually increases as the number of corrections increases.

FIG. 11 illustrates change trends in accordance with correction of the luminance distribution function which is one of the optical characteristics of the BLU 10, when the reference image is the blue image.

In FIG. 11, a first graph 11G1 may represent a luminance distribution function for the red image before correction of the optical characteristics and a second graph 11G2 may represent a luminance distribution function when the median of luminance is used as the initial correction value. A third graph 11G3 may represent a luminance distribution function when the average value of luminance is used as the initial correction value. A fourth graph 11G4 may represent a luminance distribution function after a correction by using the initial correction value and a second correction have been performed. A fifth graph 11G5 may represent a luminance distribution function after a correction by using the initial correction value, and a third correction have been performed.

Referring to the first through fifth graphs (11G1 through 11G5) of FIG. 11, the luminance uniformity gradually increases as the number of correction increases.

FIGS. 12, 13, 14, and 15 are graphs illustrating luminance distribution functions of the BLU 10 for respective color images before correction of the optical characteristics and after the optical characteristics have been corrected three times in accordance with the method of correcting optical characteristics of the BLU 10, according to an exemplary embodiment.

Figure 12:
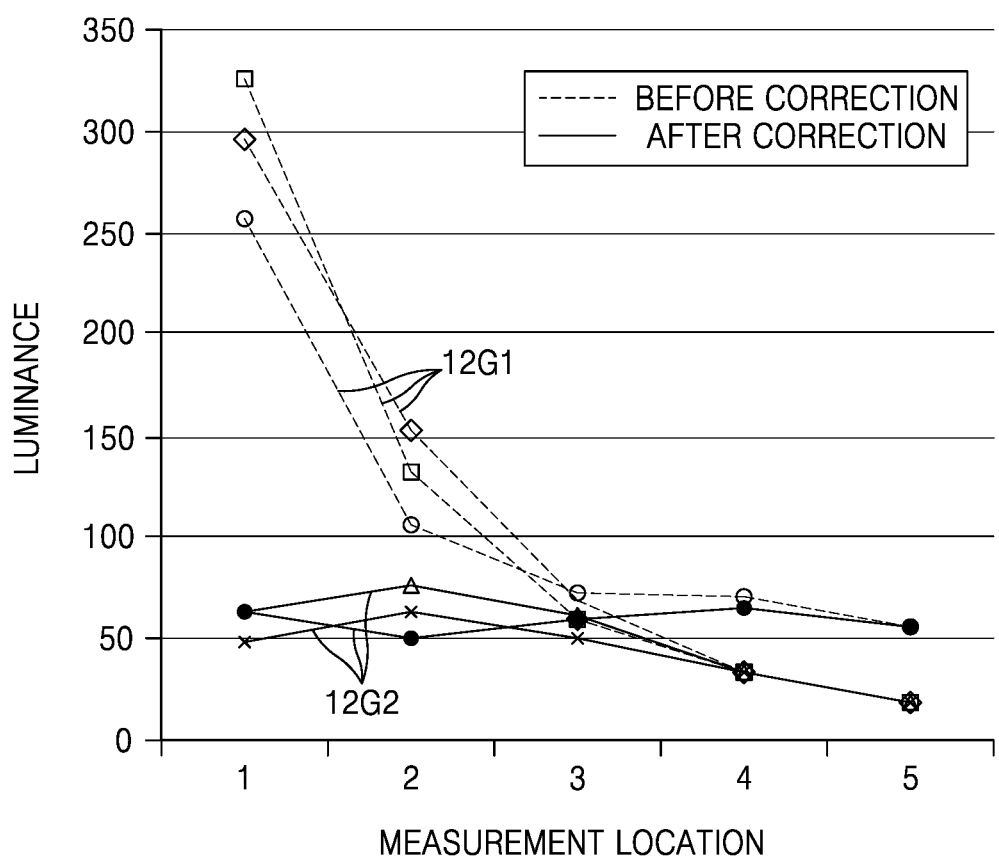
FIGS. 12, 13, 14, and 15 are graphs illustrating luminance distribution functions of the BLU for respective color images before correction of the optical characteristics and after the optical characteristics have been corrected three times in accordance with the method of correcting optical characteristics of the BLU, according to an exemplary embodiment.

FIG. 12 illustrates a result when the reference image is the red image.

In FIG. 12, a first graph group 12G1 may represent luminance distribution functions before correction for the optical characteristics, and a second graph group 12G2 may represent the luminance distribution functions after correction for the optical characteristics has been performed three times.

When the first and second graph groups 12G1 and 12G2 are compared, it will be understood that the luminance distribution becomes more uniform after correction is performed.

Figure 13:
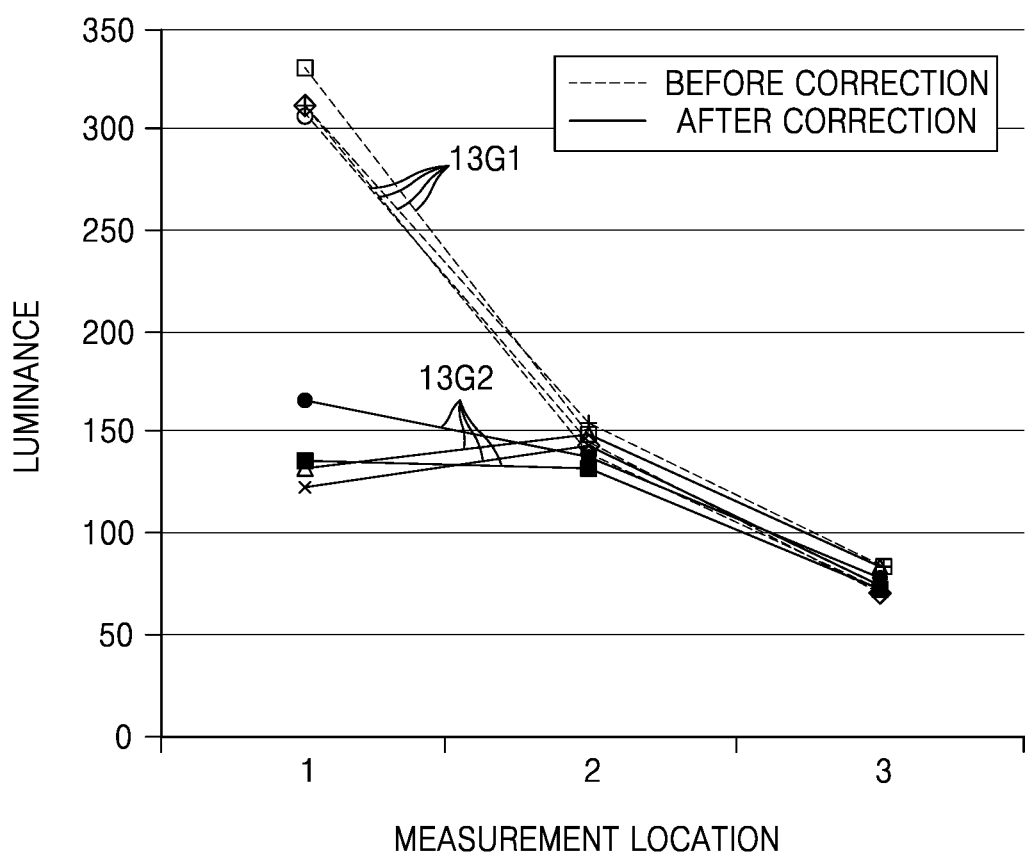

FIG. 13 illustrates a result when the reference image is the green image.

In FIG. 13, a first graph group 13G1 may represent luminance distribution functions before correction for the optical characteristics, and a second graph group 13G2 may represent the luminance distribution functions after correction for the optical characteristics has been performed three times.

When the first and second graph groups 13G1 and 13G2 are compared, it will be understood that luminance distribution becomes more uniform after correction, rather than before correction, similarly to the result in FIG. 12.

Figure 14:
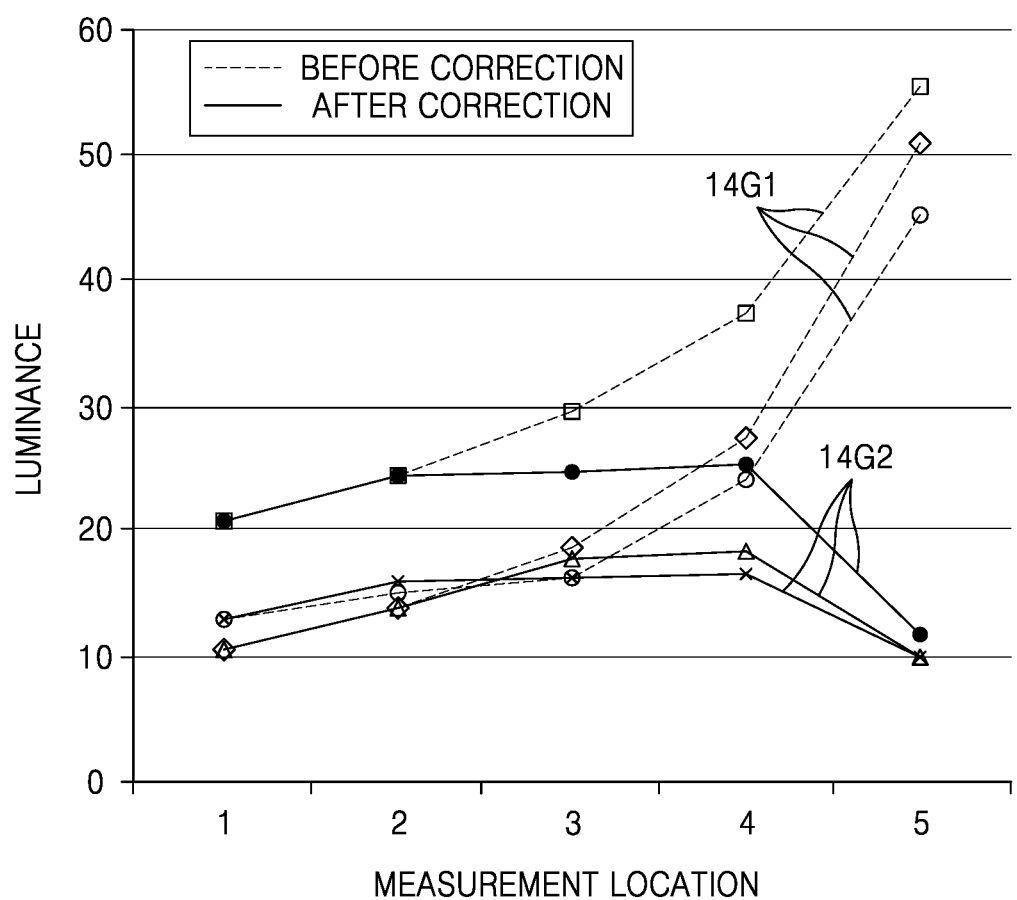

FIG. 14 illustrates a result when the reference image is the blue image.

In FIG. 14, a first graph group 14G1 may represent luminance distribution functions before correction for the optical characteristics, and a second graph group 14G2 may represent the luminance distribution functions after correction for the optical characteristics has been performed three times.

When the first and second graph groups 14G1 and 14G2 are compared, it will be understood that the luminance distribution becomes more uniform after correction, rather than before correction, similar to the results in FIGS. 12 and 13.

Figure 15:
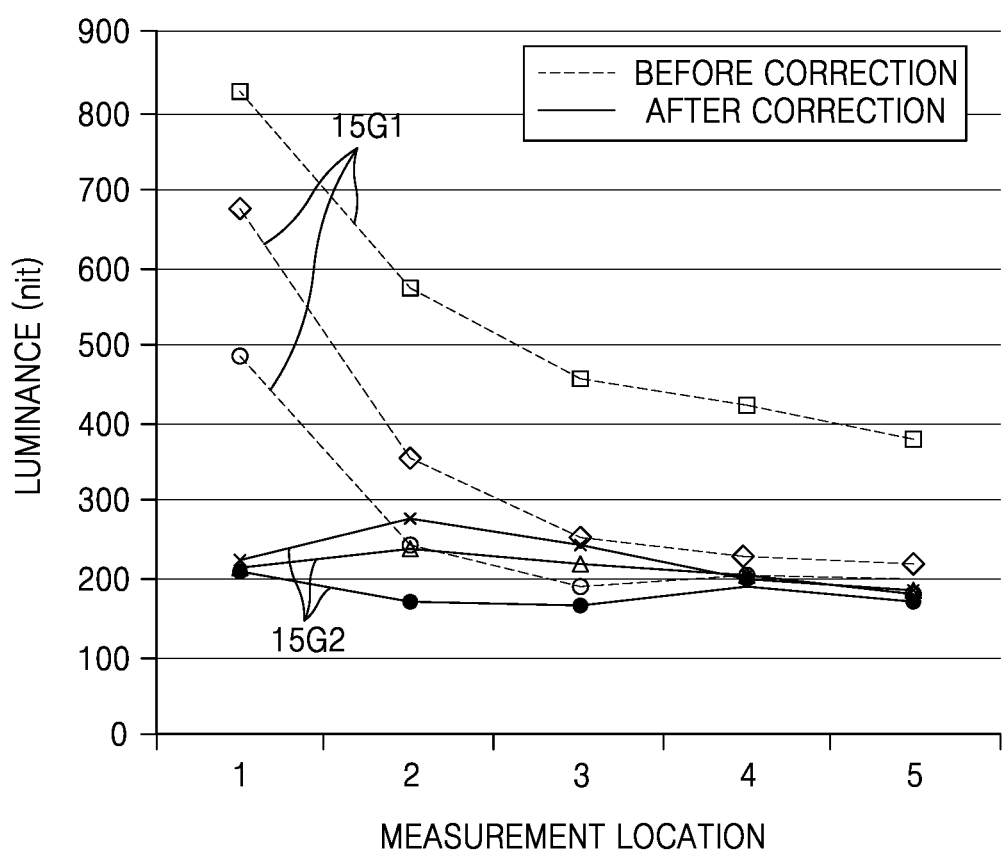

FIG. 15 illustrates a result when the reference image is the white image.

In FIG. 15, a first graph group 15G1 may represent luminance distribution functions before correction for the optical characteristics, and a second graph group 15G2 may represent the luminance distribution functions after correction for the optical characteristics has been performed three times.

When the first and second graph groups 15G1 and 15G2 are compared, it will be understood that the luminance distribution becomes more uniform after correction, rather than before correction, similar to the results in FIGS. 12 through 14.

Table 1 is a numerical summary of results of FIGS. 12 through 15.

TABLE 1

Luminance uniformity and average luminance for RGB images before correction and after the third correction

| | WHITE | | RED | | GREEN | | BLUE | |
| --- | --- | --- | --- | --- | --- | --- | --- | --- |
| | BC | AC | BC | AC | BC | AC | BC | AC |
| Luminance uniformity (%) | 23 | 60 | 5 | 24 | 22 | 44 | 14 | 39 |
| Average luminance (nit) | 381 | 206 | 113 | 51 | 179 | 119 | 26.6 | 16.7 |

In Table 1 above, "BC" denotes "before correction" and "AC" denotes "after the third correction".

A method of correcting optical characteristics of a back light unit of a glassless 3D display apparatus may include obtaining a corrected image by using an initial correction value (for example, an average value of luminance or a median of luminance) obtained from optical characteristics of a reference image, and optimizing the obtained corrected image via correction value adjustment to match a certain target value (reference optical characteristics). Uniformity of luminance of the back light unit may be improved via the aforementioned correction operations.

In addition, an operation of comparing color coordinates of a white image obtained via a combination of the reference images per color that are obtained via the correction operations and color coordinates of a reference white image, and an operation of minimizing a difference between the color coordinates (a color correction operation), may be performed. A color distortion may be reduced via the color correction operation.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A method of correcting optical characteristics of a back light unit (BLU) configured to receive light from at least one light source for a for a three-dimensional (3D) display apparatus, the method comprising:
    obtaining first optical characteristics of a reference image;
    obtaining a corrected image by applying an initial correction value, which is determined based on the first optical characteristics, to the reference image;
    obtaining second optical characteristics of the corrected image;
    determining whether the second optical characteristics match reference optical characteristics,
    outputting the corrected image based on, determining that the second optical characteristics match the reference optical characteristics, and
    obtaining a new corrected image and repeating, for the new corrected image, the obtaining the second optical characteristics and the determining whether the second optical characteristics match the reference optical characteristics, based on determining that the second optical characteristics of the corrected image do not match the reference optical characteristics,
    wherein the reference image is directly supplied from an entire light emitting surface of the BLU based on the light received from the at least one light source.

2. The method of claim 1, wherein the entire reference image is a single color image, and comprises any one of a red image, a green image, a blue image, and a white image.

3. The method of claim 1, wherein
    the first optical characteristics comprise at least one of a luminance distribution function of the reference image, an average value of luminance of the reference image, and a median of luminance of the reference image, and
    the second optical characteristics comprise at least one of a luminance distribution function of the corrected image, an average value of luminance of the corrected image, and a median of luminance of the corrected image.

4. The method of claim 1, wherein the obtaining the first optical characteristics for the reference image comprises obtaining a luminance distribution function of the reference image, an average value of luminance of the reference image, and a median of luminance of the reference image.

5. The method of claim 1, wherein the obtaining the corrected image by applying the initial correction value to the reference image comprises applying one of an average value of luminance of the reference image and a median of luminance of the reference image as a correction weight to the reference image.

6. The method of claim 1, wherein the obtaining the new corrected image comprises:
    adjusting the initial correction value to thereby generate an adjusted corrected value; and
    applying the adjusted correction value to the corrected image.

7. The method of claim 1, wherein the outputting the corrected image based on determining that the second optical characteristics match the reference optical characteristics comprises:
    composing a white image by combining correction values and correction functions detected for a red image of the reference image, a green image of the reference image, and a blue image of the reference image; and
    transferring the white image to a 3D display panel.

8. The method of claim 7, further comprising:
    obtaining color coordinates for the white image after the white image has been composed and before the white image is transferred to the 3D display panel; and
    minimizing differences between the obtained color coordinates and color coordinates of a reference white image.

9. The method of claim 8, wherein the minimizing differences between the obtained color coordinates and the color coordinates of the reference white image comprises:
    performing a correction operation for the reference image; and
    repeating the composing the white image and the obtaining the color coordinates.

10. The method of claim 1, wherein the determining whether the second optical characteristics match the reference optical characteristics comprises determining whether values of the second optical characteristics are identical to values of the reference optical characteristics.

11. The method of claim 1, wherein the determining whether the second optical characteristics match the reference optical characteristics comprises determining whether values of the second optical characteristics deviate from values of the reference optical characteristics within a predetermined range.

12. A method to control optical characteristics of a black light unit (BLU) configured to receive light from at least one light source, the method comprising:
    applying a correction value to a reference image to obtain a corrected image;
    comparing optical characteristics of the corrected image to reference optical characteristics; and
    selectively adjusting the correction value based on the comparing,
    wherein the reference image is directly supplied from an entire light emitting surface of a back light unit (BLU) based on the light received from the at least one light source and comprises a single color uniformly distributed throughout the reference image, and the applying, the comparing, and the selectively adjusting are repeatedly performed for different reference images of different colors.

13. The method of claim 12, further comprising obtaining corrected images for each of the different colors as a result of repeatedly performing the applying, comparing, and selectively adjusting.

14. The method of claim 13, further comprising:
    combining the corrected images to obtain a white image, and
    transferring the white image to a 3D display panel.

15. The method of claim 12, wherein the different colors comprise red, green, and blue.

16. The method of claim 12, further comprising obtaining the correction value by:
    measuring luminance values of the reference image at measurement regions of the BLU; and
    obtaining the correction value based on the luminance values.

17. The method of claim 12, wherein the selectively adjusting the correction value based on the comparing comprises:
- determining whether the optical characteristics of the corrected image are within a predetermined range of the reference optical characteristics;
- based on determining that the optical characteristics of the corrected image are not within the predetermined range of the reference optical characteristics, adjusting the correction value; and
- based on determining that the optical characteristics of the corrected image are within the predetermined range of the reference optical characteristics, outputting the corrected image as a final image.

18. The method of claim 17, wherein the predetermined range comprises a range within 5% of values of the reference optical characteristics.

19. A method to control optical characteristics of a black light unit (BLU) configured to receive light from at least one light source, the method comprising:
- obtaining a correction value based on optical characteristics of a reference image;
- applying the correction value to the reference image to obtain a corrected image,
- determining whether optical characteristics of the corrected image fall within a predetermined range and outputting a result of the determining; and
- selectively repeating the obtaining, the applying, and the determining based on the result,
- wherein the reference image is directly supplied from an entire light emitting surface of a back light unit (BLU) based on the light received from the at least one light source.

20. The method of claim 19, wherein the reference image comprises a single color uniformly distributed throughout the reference image.

* * * * *